United States Patent
Mandavilli et al.

(10) Patent No.: US 11,470,242 B2
(45) Date of Patent: Oct. 11, 2022

(54) SUBJECT PRIORITY BASED IMAGE CAPTURE

(71) Applicant: QUALCOMM Incorporated, San Diego, CA (US)

(72) Inventors: Ravi Teja Mandavilli, Bangalore (IN); Sravan Kumar Reddy Achamola, BN Reddy Nagar Hyderabad (IN); Kiran Koona, San Diego, CA (US); Kranthikumar Boggarapu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/225,930

(22) Filed: Apr. 8, 2021

(65) Prior Publication Data

US 2021/0227127 A1    Jul. 22, 2021

Related U.S. Application Data

(63) Continuation of application No. 15/969,237, filed on May 2, 2018, now Pat. No. 11,006,038.

(51) Int. Cl.
*H04N 5/232* (2006.01)
*G06V 40/16* (2022.01)
(Continued)

(52) U.S. Cl.
CPC ..... *H04N 5/23219* (2013.01); *G06V 40/1365* (2022.01); *G06V 40/161* (2022.01);
(Continued)

(58) Field of Classification Search
CPC ................................................ H04N 5/23219
(Continued)

(56) References Cited

U.S. PATENT DOCUMENTS 9,704,250 B1    7/2017    Shah et al.
2008/0075334 A1    3/2008    Determan et al.
(Continued)

FOREIGN PATENT DOCUMENTS

CN    103491307 A    1/2014
CN    107836109 A    3/2018
(Continued)

OTHER PUBLICATIONS

International Search Report and Written Opinion—PCT/US2019/022323—ISA/EPO—dated Jun. 3, 2019.
(Continued)

*Primary Examiner* — Joel W Fosselman
(74) *Attorney, Agent, or Firm* — Duane Morris

(57) ABSTRACT

An image capture device obtains first image data from a front facing camera on a front face of the device including a display. The first image data represents a subject within a field of view of the image capture device. Facial recognition is performed in response to the first image data from the front facing camera. The front image data is used for determining whether any subject is a priority subject, of whom at least one priority subject image-indicative data is accessible by the image capture device. A region of interest is selected, corresponding to the subject determined to be a priority subject. Automatic focus, automatic exposure, or automatic white balance is performed using the selected region of interest. Second image data from the front facing camera are captured based on the automatic focus, automatic exposure, or automatic white balance using the selected region of interest.

24 Claims, 10 Drawing Sheets

(51) Int. Cl.
*G06V 40/12* (2022.01)
*H04N 5/235* (2006.01)
*H04N 9/73* (2006.01)

(52) U.S. Cl.
CPC ....... *H04N 5/2353* (2013.01); *H04N 5/23212* (2013.01); *H04N 5/23293* (2013.01); *H04N 9/735* (2013.01)

(58) Field of Classification Search
USPC ..................................................... 348/223.1
See application file for complete search history.

(56) References Cited

U.S. PATENT DOCUMENTS

| | | |
|---|---|---|
| 2011/0249961 A1 | 10/2011 | Brunner |
| 2013/0169853 A1 | 7/2013 | Luong |
| 2013/0223698 A1 | 8/2013 | Corcoran et al. |
| 2015/0016693 A1 | 1/2015 | Gattuso |
| 2016/0021293 A1 | 1/2016 | Jensen et al. |
| 2016/0119672 A1 | 4/2016 | Alonso et al. |
| 2017/0339339 A1 | 11/2017 | De et al. |
| 2019/0342491 A1 | 11/2019 | Mandavilli et al. |

FOREIGN PATENT DOCUMENTS

| | | |
|---|---|---|
| JP | 2018005149 A | 1/2018 |
| WO | 2016110090 A1 | 7/2016 |

OTHER PUBLICATIONS

Jafri R., et al., "A Survey of Face Recognition Techniques", Journal of Information Processing Systems, vol. 5, No. 2, Jun. 2009, pp. 41-68.

Pérmi K., "The Curious Case of Rear-Camera Selfies in 2016", Public Access, 2016, Retrieved from internet on Nov. 20, 2017, https://www.engadget.com/2016/11/15/the-curious-case-of-rear-camera-selfies-in-2016/, pp. 1-15.

SUBJECT PRIORITY BASED IMAGE CAPTURE

RELATED APPLICATIONS

This application is a continuation of, and claims priority to, application Ser. No. 15/969,237, filed May 2, 2018, the disclosure of which is incorporated herein by reference in its entirety.

BACKGROUND

Field of the Disclosure

This disclosure relates generally to imaging devices and, more specifically, to automated image capture control.

Description of Related Art

Digital image capture devices, such as cameras in cell phones and smart devices, use various signal processing techniques in an attempt to render high quality images. For example, these image capture devices automatically focus their lens for image sharpness, automatically set the exposure time based on light levels, and automatically adjust the white balance to accommodate for the color temperature of a light source. In some examples, image capture devices include facial detection technology. Facial detection technology allows the image capture device to identify faces in a field of view of an image capture device's lens. The image capture device may then apply the various signal processing techniques based on the facial identifications.

SUMMARY

According to one aspect, a method for controlling an image capture device comprises obtaining first image data from a camera of the image capture device. The first image data represents one or more subjects within a field of view of the image capture device. The method includes performing facial recognition on the first image data. Further, and based on the facial recognition, the method includes determining that the one or more subjects include a particular subject based on priority subject image-indicative data. The method also includes selecting a region of interest corresponding to at least the particular subject. Further, the method includes processing a second image based on the selected region of interest.

According to another aspect, an image capture device comprises a memory containing priority subject image-indicative data and at least one processor. The processor is coupled to the memory for accessing the image-indicative data. The processor is configured to obtain first image data from a camera of the image capture device, where the first image data represents one or more subjects within a field of view of the image capture device. The processor is configured to perform facial recognition on the first image data and determine, based on the facial recognition, that the one or more subjects include a particular subject based on priority subject image-indicative data. The processor is configured to select a region of interest corresponding to at least the particular subject. The processor is configured to process a second image based on the selected region of interest.

According to another aspect, a non-transient computer-readable storage medium comprises computer-executable instructions stored tangibly thereon. The instructions, when executed by one or more processors, cause the one or more processor to: obtain first image data from a camera of the image capture device, where the first image data represents one or more subjects within a field of view of the image capture device; perform facial recognition on the first image data; determine, based on the facial recognition, that the one or more subjects include a particular subject based on priority subject image-indicative data; select a region of interest corresponding to at least the particular subject; and process a second image based on the selected region of interest.

According to another aspect, an image capture device comprises: means for obtaining first image data from a camera of the image capture device, where the first image data represents one or more subjects within a field of view of the image capture device; means for performing facial recognition on the first image data; means for determining, based on the facial recognition, that the one or more subjects include a particular subject based on priority subject image-indicative data; means for selecting a region of interest corresponding to at least the particular subject; and means for processing a second image based on the selected region of interest.

DETAILED DESCRIPTION

Figure 1:
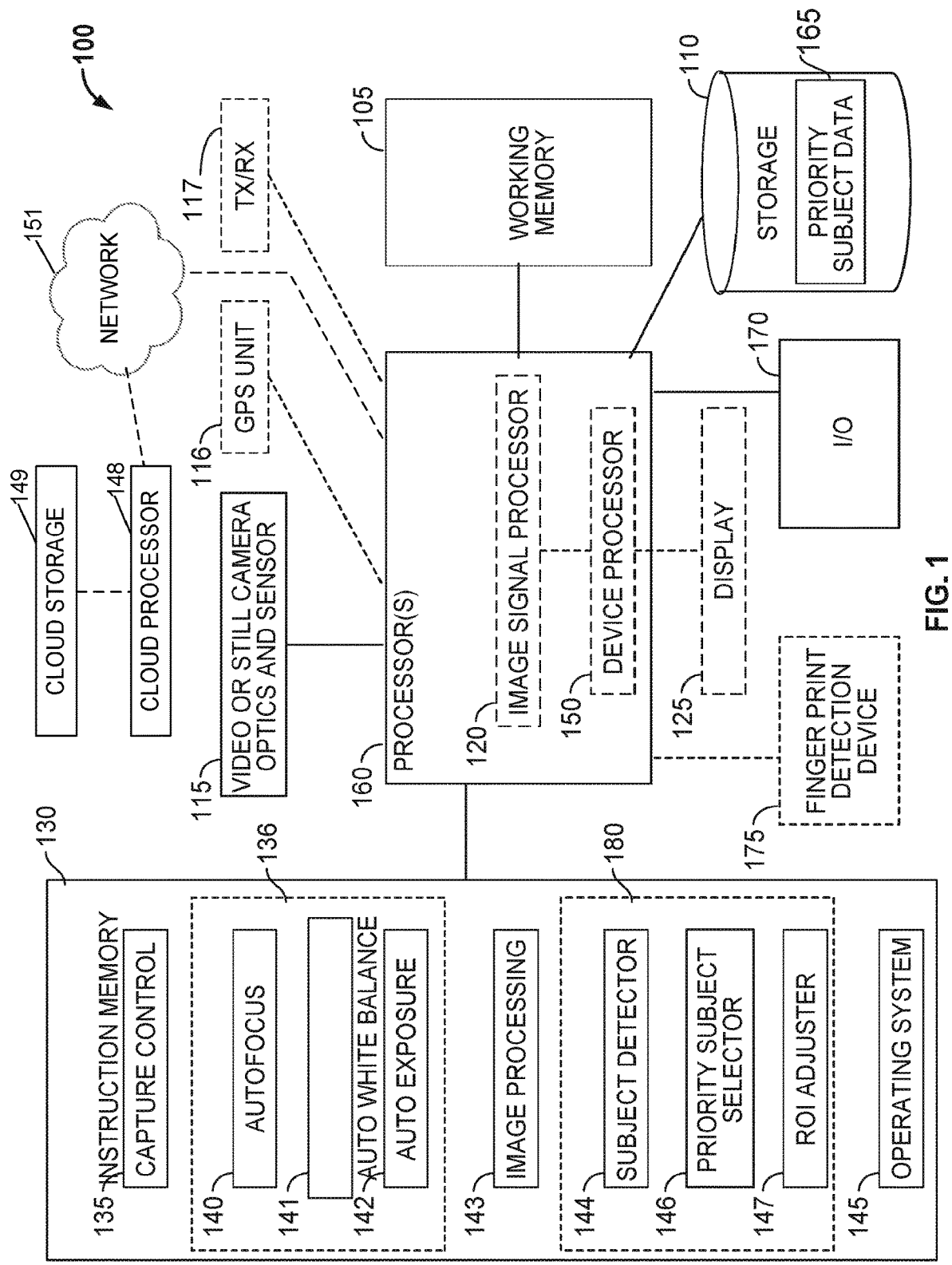
FIG. 1 is a block diagram of an exemplary image capturing device having priority subject based automatic focus, automatic exposure, or automatic white balance control.

While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings. It should be understood, however, that the present disclosure is not intended to be limited to the particular forms disclosed. Rather, the present disclosure covers all modifications, equivalents, and alternatives that fall within the spirit and scope of these exemplary embodiments.

Many cameras are equipped to identify faces in the field of view (FOV) of the camera, and select a lens position that provides the best focus value for a region of interest (ROI) containing all of the identified faces. Many times, however, the selected lens position does not result in an optimal captured image for a particular face or subset of the faces in an image containing several faces.

This disclosure provides an image capture device having one or more of priority subject-based automatic focus (AF), automatic exposure (AE), or automatic white balance (AWB) control, and corresponding methods. The image capture device can identify subjects within its field of view (FOV), and determine whether any one or more of the identified subjects is a priority subject. A priority subject can be, for example, an owner or other primary user of the image capture device, or another person or animal designated as a priority subject, in a manner described below. If any one of the identified subjects is a priority subject, the image capture device can determine a region of interest (ROI) that includes the priority subjects. For example, the region of interest can include the priority subjects and exclude all subjects other than priority subjects. The image capture device can then adjust one or more of AF, AE, or AWB of the image capture device based on image data within the ROI, which includes the priority subject(s). In this description, unless expressly stated otherwise, the ROI refers to the region of interest that is used during AF, AE, and/or AWB.

In this description, the terms "priority subject" and "prioritized person" are used interchangeably to refer to person or animal (e.g., a pet), identified by a user of the camera as being prioritized, and for whom the image capture device contains one or more images to support face recognition. A prioritized person is an example of a priority subject, and in the examples described herein, the image capture device is equally capable of applying the same methods to animals, or statues or paintings including faces.

Among other advantages, the image capture device is capable of providing automated image capture enhancements in consideration of lighting conditions affecting the priority subjects. For example, the image capture device can automatically optimize one or more of AF, AE, or AWB based on image data within its field of view that represents priority subjects. For example, a primary user of the image capture device can be a predetermined priority subject. When the primary user of the image capture device takes a picture of themselves (e.g., a selfie), the AF, AE, and/or AWB settings are optimized for the ROI containing the primary user of the image capture device, regardless of others who may appear in the picture. Instead of selecting a compromise lens position that minimizes total focusing error of all the faces in the FOV, the lens position is selected to minimize the focusing error of the prioritized face(s). Thus, priority subjects receive optimal camera settings when the image capture device takes their picture. For example, when using the front camera for a selfie, the image capture device can ensure that the owner of the camera is in focus, even if other faces in the image are out of focus. Similarly, exposure and/or white balance may also be optimized for the priority subjects instead of averaged or otherwise weighted across other subjects.

FIG. 1 is a block diagram of an exemplary image capture device 100. The functions of image capture device can be implemented in one or more processors, one or more field-programmable gate arrays (FPGAs), one or more application-specific integrated circuits (ASICs), one or more state machines, digital circuitry, any other suitable circuitry, or any suitable hardware. In this example, image capture device 100 includes at least one processor 160 that is operatively coupled to (e.g., in communication with) camera optics and sensor 115 for capturing images. Processor 160 is also operatively coupled to instruction memory 130, working memory 105, input device 170, and storage medium 110. Input device 170 can be, for example, a keyboard, a touchpad, a stylus, a touchscreen, or any other suitable input device. In some examples, processor 160 is also operatively coupled to one or more of Global Positioning System (GPS) unit 116, transceiver 117, and display 125.

The image capture device 100 can be implemented in a computer with image capture capability, a special-purpose camera, a multi-purpose device capable of performing imaging and non-imaging applications, or any other suitable device. For example, image capture device 100 can be a portable personal computing device such as a mobile phone, digital camera, tablet computer, laptop computer, personal digital assistant, or any other suitable device.

Although this description refers to processor 160, in some examples processor 160 can include one or more processors. For example, processor 160 can include one or more central processing units (CPUs), one or more graphics processing units (GPUs), one or more digital signal processors (DSPs), one or more image signal processors (ISPs), one or more device processors, and/or one or more of any other suitable processors. In some examples, processor 160 can include different types of processors. For example, processor 160 can include an image signal processor 120 and a device processor 150. In this example, image signal processor 120 can perform various image capture operations on received image data to execute AF, AE, and/or AWB. Device processor 150 can perform various management tasks such as controlling display 125 to display captured images, or writing to or reading data from working memory 105 or storage medium 110. Device processor 150 can also configure image capture parameters that can be used by image signal processor 120 to capture images, such as AF, AE, and/or AWB parameters. Although in FIG. 1 processor 160 is located within image capture device 100, in some examples, processor 160 can include one or more cloud-distributed processors. For example, one or more of the functions described below with respect to processor 160 can be carried out (e.g., performed) by a remote processor, such as a cloud processor 148 within a cloud-based server, where the cloud processor 148 can be connected to the processor 160 via a network 151. The cloud processor 148 can be coupled to non-transitory cloud storage media 149, which may be collocated with, or remote from, the cloud processor 148. The network 151 can be any personal area network (PAN), local area network (LAN), wide area network (WAN) or the Internet.

Camera optics and sensor 115 can include one or more image sensors and one or more lenses to capture images. Processor 160 can control camera optics and sensor 115 to capture images. For example, processor 160 can instruct camera optics and sensor 115 to initiate an image capture (e.g., take a picture), and can receive the captured image from camera optics and sensor 115. Camera optics and sensor 115, storage 110, and the processor 160 provide a means for capturing second image data from the front facing camera based on the at least one of automatic focus, automatic exposure, or automatic white balance using the selected region of interest.

Instruction memory 130 can store instructions that can be accessed (e.g., read) and executed by processor 160. For example, instruction memory 130 can include read-only memory (ROM) such as electrically erasable programmable read-only memory (EEPROM), flash memory, a removable disk, CD-ROM, any non-volatile memory, or any other suitable memory.

Processor 160 can store data to, and read data from, working memory 105. For example, processor 160 can store a working set of instructions to working memory 105, such as instructions loaded from instruction memory 130. Processor 160 can also use working memory 105 to store dynamic data created during the operation of image capture device 100. Working memory 105 can be a random access memory (RAM) such as a static random access memory (SRAM) or dynamic random access memory (DRAM), or any other suitable memory.

In this example, instruction memory 130 stores capture control instructions 135, AF instructions 140, AWB instructions 141, AE instructions 142, image processing instructions 143, subject detector instructions 144, priority subject selector instructions 146, ROI adjuster instructions 147, and operating system instructions 145. Instruction memory 130 can also include additional instructions that configure processor 160 to perform various image processing and device management tasks.

AF instructions 140 can include instructions that, when executed by processor 160, cause a lens of camera optics and sensor 115 to adjust its lens position. For example, processor 160 can cause a lens of camera optics and sensor 115 to adjust so that light from a region of interest within a field of view (FOV) of the imaging sensor is focused in a plane of the sensor. The selected ROI can correspond to one or more focus points of the AF system. AF instructions 140 can include instructions for executing autofocus functions, such as finding the optimal lens position for bringing light from a region of interest into focus in the plane of a sensor. Autofocus can include, for example, phase detection autofocus (PDAF), contrast autofocus, or laser autofocus. PDAF divides incoming light into pairs of images and captures the divided light rays coming from the opposite sides of the lens, creating a rangefinder. The two images are then analyzed to find a separation (phase) error and determine whether the region of interest of the sensor is in focus in the sensor's plane. Contrast AF moves a lens through its position range, stopping at a point where maximal contrast is detected between adjacent pixels at an edge in the FOV. Laser AF emits a light from a laser or light emitting diode (LED) on the subject and calculates a distance to the subject based on how long it takes the light to reach the subject and return.

AWB instructions 141 can include instructions that, when executed by processor 160, cause processor 160 to determine a color correction to be applied to an image. For example, the AWB instructions 141, when executed by processor 160, can cause processor 160 to determine an average color temperature of the illuminating light source under which an image was captured, and to scale color components (e.g., R, G, and B) of the image so they conform to the light in which the image is to be displayed or printed. In some examples, the AWB instructions 141, when executed by processor 160, can cause processor 160 to determine the illuminating light source in a region of interest of the image. The processor 160 can then apply a color correction to the image based on the determined color temperature of the illuminating light source in the region of interest of the image.

AE instructions 142 can include instructions that, when executed by processor 160, cause processor 160 to determine the length of time that sensing elements, such as an imaging sensor of camera optics and sensor 115, integrate light before an image is captured. For example, processor 160 can meter ambient light, and select an exposure time for a lens based on the metering of the ambient light. As the ambient light level increases, the selected exposure time becomes shorter. As the ambient light level decreases, the selected exposure time becomes longer. In the case of a digital single-lens reflex (DSLR) camera, for example, AE instructions 142, when executed, can determine the exposure speed. In some examples, processor 160 can meter the ambient light in a region of interest of the field of view of a sensor of camera optics and sensor 115.

A 3A engine 136 provides a means for performing at least one of automatic focus, automatic exposure, or automatic white balance of the image capture device based on using the selected region of interest. In some examples of image capture devices 100, the three sets of instructions, AF instructions 140, AWB instructions 141 and AE instructions 142, are included in "3A" engine 136. The 3A engine 136 can include instructions that cause processor 160 to operate on raw image sensor data measured by an image sensor of camera optics and sensor 115 prior to capturing an image.

Capture control instructions 135 can include instructions that, when executed by processor 160, configure processor 160 to adjust a lens position, set an exposure time, set a sensor gain, and/or configure a white balance filter of the image capture device 100. Capture control instructions 135 can further include instructions that, when executed by processor 160, control the overall image capture functions of image capture device 100. For example, capture control instructions 135, when executed by processor 160, can cause processor 160 to execute AF instructions 140 to calculate a lens or sensor movement to achieve a desired autofocus position and output a lens control signal to control a lens of camera optics and sensor 115.

Image data of priority subjects can be stored in a means for storing at least one priority subject image-indicative data corresponding to one or more priority subjects. The means for storing can be a non-transitory, machine-readable storage medium 110 or cloud storage 149. A priority subject can include, for example, an owner or other user of the image capture device 100, a person, an animal, or an object. Processor 160 can determine whether detected subjects are predetermined priority subjects based on previously stored image data corresponding to predetermined prioritized persons (e.g., the primary user, the owner, the owner's child or, or the owner's spouse) or animals (e.g., the owner's pet). Image data corresponding to a predetermined prioritized person can be stored, for example, in storage medium 110. In some examples, a user of image capture device 100 can provide image data associated with predetermined priority subjects to image capture device 100 by capturing one or more images of the subject with the image capture device 100 and designating the subject of the images as a priority subject, or by downloading images of the priority subject from another device or network.

The means for storing can be a local storage medium 110, such as a hard drive, a solid-state memory, or a FLASH memory, for example. The means for storing can also be a remote storage medium, such as cloud storage 149, which can be embodied in a cloud-based server memory, a memory device on another image capture device 100, a networked computer, or any other suitable remote storage device. Storage medium 110 can include priority subject data 165 comprising image data for one or more predetermined prioritized persons. For example, priority subject data 165 can include one or more images for each prioritized person. In some examples, priority subject data 165 includes multiple images corresponding to multiple views for each prioritized person, for example, a plurality of images from a plurality of different angles. For example, the multiple images can include a front image of the predetermined prioritized person, a right side image of the predetermined prioritized person, and a left side image of the predetermined prioritized person.

In the examples described below, the priority subject data 165 includes image data. In other embodiments, the priority subject data 165 can include other types of priority subject image-indicative data, which are indicative of image data, where the priority subject image-indicative data are based on (e.g., extracted from, derived from or representative of) image data of a priority subject. For example, the priority subject data 165 can include a plurality of extracted facial features and/or fiducial-point-based face graph data for the priority subject. In other embodiments, the priority subject image-indicative data in priority subject data 165 can include holistic data for the priority subject, such as an array of intensity values or dimensionality-reduced eigenface picture data in a principle coordinate (latent variable) system. In other embodiments, the priority subject image-indicative data of priority subject data 165 can include coefficient data for a neural network trained to identify members of a predetermined set of priority subjects, such as faces. These are only examples of priority subject image-indicative data used in exemplary pattern recognition (e.g., face recognition) techniques, and are not exclusive. For brevity, the term, "image-indicative data" is used below to refer to image data and/or other forms of data based on, extracted from, or representative of image data. The image-indicative data include, but are not limited to, data to which a pattern recognition technique can be applied, as well as RAW, intermediate or partially-processed image sensor data.

For example, if the priority subject image-indicative data comprise extracted facial features and/or fiducial-point-based face graph data, then the pattern recognition (e.g., facial recognition) includes extracting facial features and/or fiducial point based graph data from the image data of the subject(s) in the FOV of the image capture device for comparison with the priority subject image-indicative data in the priority subject data.

If the priority subject image-indicative data comprise an array of intensity values, then the facial recognition includes determining an array of intensity values based on the image data from the subject(s) in the FOV of the image capture device for comparison with the priority subject image-indicative data in the priority subject data.

If the priority subject image-indicative data comprise dimensionality-reduced eigenface picture data in a principle coordinate (latent variable) system, then the facial recognition includes transforming image data from the subject(s) in the FOV of the image capture device to the principal coordinates (latent variables) for comparison with the priority subject image-indicative data in the priority subject data.

If the priority subject image-indicative data include coefficient data for a neural network trained to identify members of a predetermined set of priority subjects' faces then the facial recognition includes inputting the image data from the subject(s) in the FOV of the image capture device to the neural network and receiving from the neural network a value indicating a probability that the subject is one of the priority subjects.

In the example of FIG. 1, the priority subject data 165 is stored locally in the image capture device 100. In other embodiments, the priority subject data 165 is stored remotely. For example, the priority subject data can be stored in cloud storage 149 coupled to cloud processor 148, and the processor 160 can access the priority subject data using a communications protocol, such as hypertext transport protocol (HTTP). In other embodiments, the priority subject data 165 is initially stored locally in image capture device 100, and is copied to cloud storage 149. If the user has multiple image capture devices, the user can access the priority subject data in from cloud storage. In some embodiments, face detection and/or face recognition are initiated by processor 160 and performed remotely by cloud processor 148, using the copy of priority subject data 165 in cloud storage 149.

Subject detector block 144 provides means for initiating facial detection on first image data representing one or more subjects within a field of view of the image capture device to detect one or more faces. Subject detector instructions 144 can include instructions that, when executed by processor 160, cause processor 160 to detect one or more subjects in a field of view of a lens of camera optics and sensor 115 as being faces. For example, processor 160 can obtain raw image sensor data of an image in a field of view of a lens of camera optics and sensor 115. In some embodiments, processor 160 can initiate face detection and determine if one or more subjects are in the field of view by, for example, performing the facial detection locally within processor 160. In other embodiments, processor 160 can initiate remote performance of face detection by transmitting a request to a cloud processor 148 or other remote server. The request causes the cloud processor 148 or other remote server to perform the computations to determine if the field of view of image capture device 100 contains one or more faces, and respond to the processor 160 with identification of region(s) in the FOV containing a face.

Priority subject selector block 146 provides means for performing facial recognition on the first image data in response to obtaining the first image data from the camera (e.g., front facing camera) and detection of a face within the first image data. Priority subject selector 146 determines whether a recognition criterion is met between the image-indicative data (e.g., image data) of a detected person in the FOV and previously stored priority subject image-indicative data (e.g., image data) of a predetermined priority subject. For example, the recognition criterion may specify a threshold probability that the person in the FOV is a priority subject for whom corresponding priority subject image-indicative data (e.g., image data) are stored in the priority subject data 165. Priority subject selector 146 can identify one or more priority subjects. For example, priority subject selector 146 can identify one of at least two detected persons as a priority subject. As another example, priority subject selector 146 can identify two of at least two detected subjects as priority subjects. More generally, priority subject selector 146 can select any subset of a plurality of detected persons or animals as priority subjects.

Priority subject selector 146 initiates a facial recognition process to determine whether any face detected by the subject detector 144 is a priority subject. In some embodiments, priority subject selector 146 can include initiation instructions that, when executed by processor 160, cause processor 160 to locally determine (e.g., identify) whether any of the subjects detected is a priority subject for whom priority subject image-indicative data (e.g., images) have been previously stored. In other embodiments, priority subject selector 146 can include initiation instructions that, when executed by processor 160, cause processor 160 to transmit a request to the remote cloud processor 148. The request causes the cloud processor 148 to determine whether any of the detected subjects is a priority subject for whom priority subject image-indicative data have been previously stored and to respond to processor 160 with identification(s) of any recognized priority subject.

For example, processor 160 can determine if any detected subject in the region of interest is a previously-identified priority subject identified in priority subject data 165 stored in the image capture device 100. Processor 160 can use priority subject image-indicative data (e.g., image data) corresponding to predetermined priority subjects to make the determination. For example, processor 160 can compare image data of the subjects detected to image data of a predetermined priority subject using, for example, facial recognition techniques. For example, processor 160 can compare image data of the detected subjects (or data extracted or derived therefrom) to image data of primary user (e.g., owner) of the image capture device 100.

ROI adjuster instructions 147 are executed in processor 160 to provide a means for selecting a region of interest of the image data corresponding to the one or more subjects determined to be priority subjects. Processor 160 can determine a region of interest of the field of view of the lens of camera optics and sensor 115 that includes any areas of the image determined to include detected subjects. ROI adjuster instructions 147 can include instructions that, when executed by processor 160, cause processor 160 to adjust a region of interest (e.g., such as one determined by processor 160 executing subject detector instructions 144) to include only one or more detected subjects determined to be priority subjects from the priority subject data 165. For example, ROI adjuster instructions 147 can adjust a region of interest (for performing AF, AE and/or AWB) to include only detected subjects that were also identified priority subjects in the priority subject data 165. In other words, the region of interest (for performing AF, AE and/or AWB) can exclude all subjects other than priority subjects. This allows the prioritized persons/subjects to have the best focus, exposure and white balance, even if there are other subjects in the FOV closer to the image capture device than the prioritized persons/subjects.

For example, in an image containing a large group of people in multiple rows, with a priority subject near an end of the back row, the image capture device will autofocus on the priority subject. In another example, in a dark room (or a brightly lit space) containing a priority subject, the image capture device will set the exposure speed so the priority subject has mid-tone exposure. In another example, the image capture device identifies the neutral tones (the whites, grays, and blacks) in the ROI containing a priority subject and then calibrates the rest of the image to the temperature of the neutral colors in the ROI containing the priority subject.

If the FOV contains one or more priority subjects, the priority subject detector 146 adjusts the ROI for AF, AE, and/or AWB to include the priority subject(s) and exclude other detected faces from consideration during AF, AE and/or AWB. (The adjustment of the ROI for AF, AE, and/or AWB can affect the lens position, exposure speed and/or white balance, but does not exclude any area within the FOV from the image captured.)

Processor 160 can use the adjusted region of interest to perform one or more of AF, AWB, or AE. For example, ROI adjuster instructions 147 can cause processor 160 to use the adjusted region of interest as the region of interest when executing AF instructions 140. Similarly, ROI adjuster instructions 147 can cause processor 160 to use the adjusted region of interest as the region of interest when executing AWB instructions 141 or AE instructions 142.

In some examples, subject detector instructions 144, priority subject selector instructions 146, and ROI adjuster instructions 147 are included in a subject based ROI engine 180. Subject based ROI engine 180 can be executed by, for example, image signal processor 120, or a dedicated digital signal processor (DSP) (not shown). Subject based ROI engine 180, when executed by one or more processors, can cause the one or more processors to identify an ROI such that the one or more processors, when executing 3A engine 136, perform at least one of automatic focus, automatic exposure, or automatic white balance of image capture device 100 based on the adjusted ROI.

In some examples, subject based ROI engine 180 is activated based on activation of a camera or image capture device 100. For example, processor 160 can detect when a user activates camera optics and sensor 115. Upon detecting activation, processor 160 can execute subject based ROI engine 180. In some examples, detecting activation of a camera or image capture device 100 includes detecting activation of a front camera of the image capture device 100 located on the same side of the device as the display (e.g., a front camera of a mobile phone). Activation of the front camera is an indication that the user intends to take a selfie, and can be used as a criterion for activating the subject based ROI engine 180.

In some examples, subject based ROI engine 180 is activated based on fingerprint detection of the primary user of image capture device 100. For example, fingerprint detection device 175 can indicate to processor 160 when a user has successfully authenticated themselves via a fingerprint authentication. Upon detecting successful authentication, processor 160 can execute subject based ROI engine 180. Other forms of biometric authentication are also contemplated, such as retina scanning or voice recognition systems and methods, and other systems and methods as well. For example, subject based ROI engine 180 can be automatically activated when the camera is active and the user performs a fingerprint authentication or speaks a predetermined "priority subject" command for activating subject based ROI engine 180.

Image processing instructions 143 can include instructions that cause processor 160 to execute one or more image processing functions such as demosaicing, noise reduction, cross-talk reduction, color processing, gamma adjustment, image filtering (e.g., spatial image filtering), lens artifact or defect correction, image sharpening, or other image processing functions.

Operating system instructions 145 can include instructions that, when executed by processor 160, cause processor 160 to implement an operating system. The operating system can act as an intermediary between programs, such as user applications, and the processor 160. Operating system instructions 145 can include device drivers to manage hardware resources such as the camera optics and sensor 115, display 125, GPS unit 116, or transceiver 117. Instructions contained in image processing instructions 143 discussed above can interact with hardware resources indirectly, through standard subroutines or application program interfaces (APIs), that can be included in operating system instructions 145. Operating system instructions 145 can then interact directly with these hardware components. Operating system block 145 can further configure the image signal processor 120 to share information with device processor 150.

Figure 2:
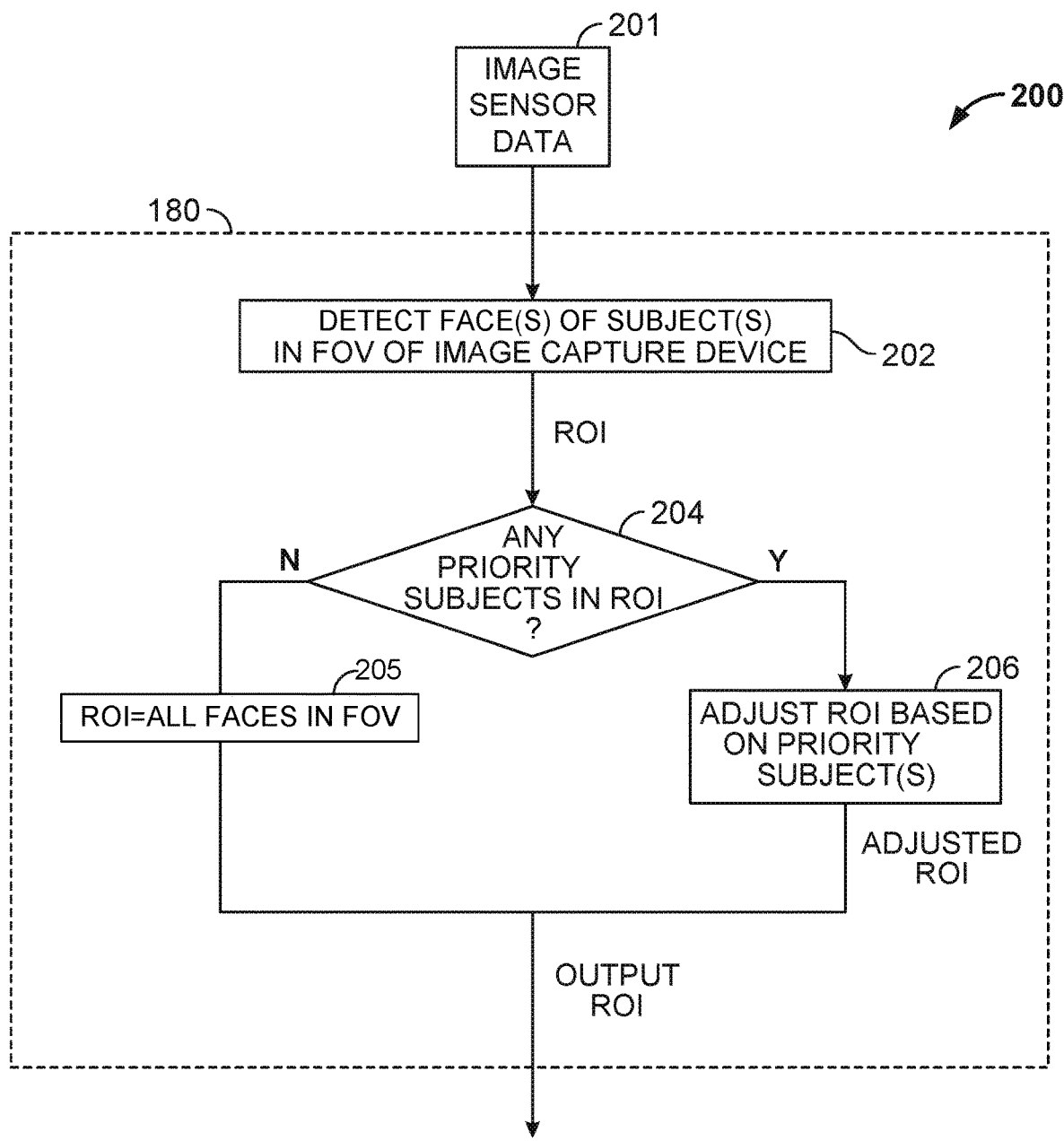
FIG. 2 is a flow chart of a method for selecting a region of interest (ROI) in a field of view (FOV) using the exemplary image capturing device of FIG. 1.

FIG. 2 is a flow chart of an exemplary method 200 for selecting a region of interest in a field of view of an image capture device, such as the image capture device 100 of FIG. 1. The method can be carried out by, for example, the ROI engine 180 of FIG. 1.

At block 202, one or more subjects among the image sensor data 201 in a field of view of an image capture device are detected to provide a region of interest (ROI). In some embodiments, block 202 determines whether the FOV contains a face. Block 202 can be a face detection module.

At block 204, the detected face(s) (or data extracted or derived therefrom) is (are) compared to the priority subject image-indicative data (e.g., images of faces) in the priority subject data 165, and a determination is made as to whether any of the regions of interest includes any priority subject(s). For example, facial recognition may be applied by comparing extracted features, fiducial measurements, or the like. If the region of interest does not include any priority subjects, execution proceeds to block 205. If the region of interest includes any priority subjects, the method proceeds to block 206.

At block 205, the regions of interest can be set to include all faces detected by the face detection block 202. This causes the AF to select the optimum lens position for all of the detected faces. For example, the total focus error for all the faces in the image is minimized (but the individual focus error for each individual image is not necessarily minimized).

At block 206, the region of interest is adjusted based on the priority subjects. For example, the region of interest for AF, AE, and/or AWB is adjusted to include subjects determined to be prioritized persons and to exclude other faces within the FOV. This will cause the camera to select a lens position, exposure speed, and/or color temperature optimized for the prioritized faces. The adjusted region of interest is provided as the output region of interest.

Figure 3A:
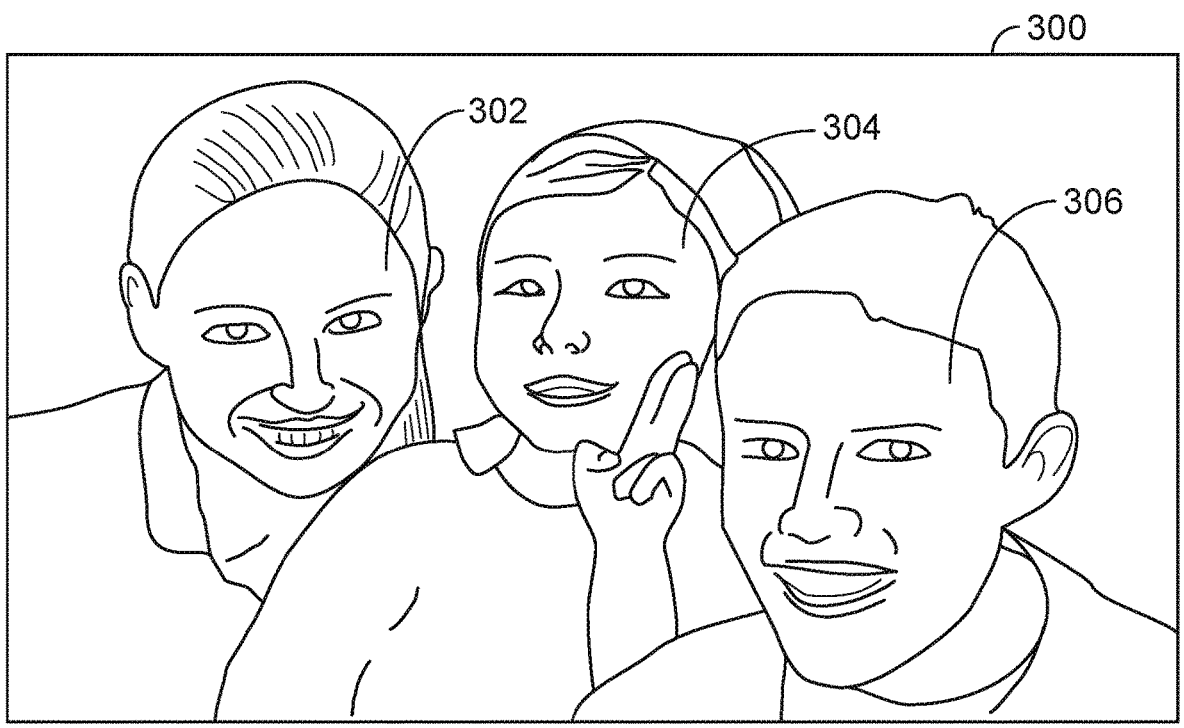
FIG. 3A is an image showing subjects in a FOV of the exemplary image capturing device of FIG. 1.
Figure 3B:
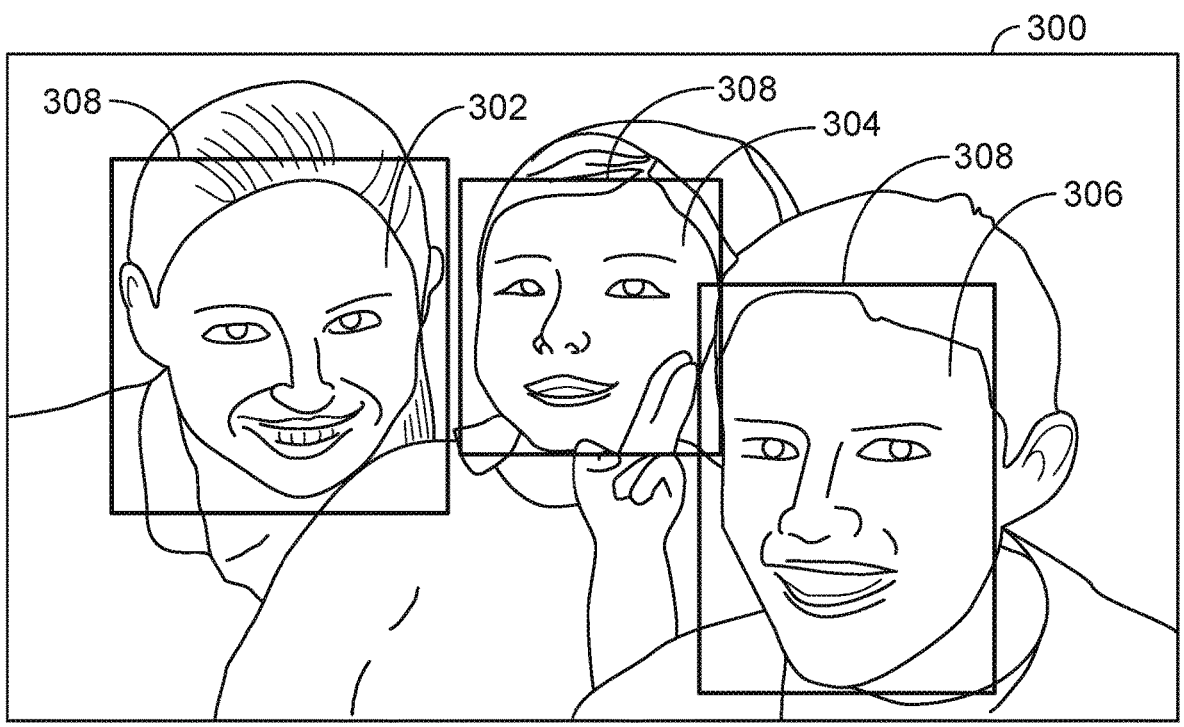
FIG. 3B illustrates the image of FIG. 3A with a ROI identified that includes the faces of the subjects in the FOV.
Figure 3C:
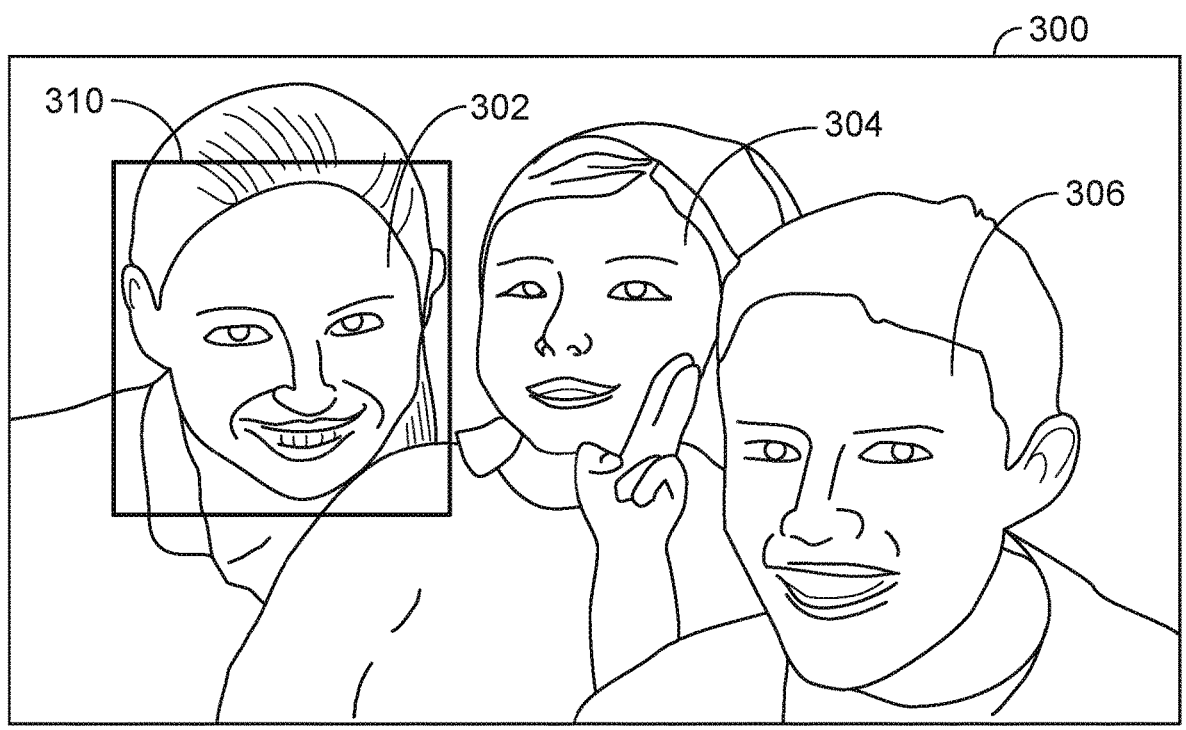
FIG. 3C illustrates the image of FIG. 3A with an adjusted ROI identified that includes the face of a priority subject of the subjects in the FOV.

FIGS. 3A, 3B, and 3C illustrate an exemplary image preview 300 within a field of view of the exemplary image capturing device 100 of FIG. 1. The FOV may contain a single subject, or two or more subjects. The image preview 300 includes faces of a first person 302, second person 304, and third person 306. Image capture device 100 can perform facial detection and recognition on image data associated with image 300 to identify detected subjects.

For example, FIG. 3B illustrates a region of interest 308 that includes image data for all identified subjects (faces) including faces of first person 302, second person 304, and third person 306. If used for AF, AE, and AWB, the ROI 308 as shown in FIG. 3B is optimized for all three persons 302, 304 and 306. The lens position is selected to minimize the total focus error among all three faces, but does not guarantee the best possible focus for any individual one of the three faces. Similarly, the exposure is selected to minimize the total exposure error among all three faces, but does not guarantee the best possible exposure for any individual one of the three faces. And the white balance is selected to minimize the total color temperature error among all three faces, but does not guarantee the best possible color temperature for any individual one of the three faces.

For the example of FIG. 3B, first person 302 is a predetermined prioritized person, for whom the priority subject data 165 (prioritized person list) includes one or more priority subject image-indicative data (e.g., images). The remaining subjects 304 and 306 are not prioritized persons. For example, image capturing device 100 can compare features of the face of person 302 to images stored in the prioritized person list and identify image data corresponding to first person 302 as a predetermined prioritized person. Thus, an ROI 308 as shown in FIG. 3B can result in an image quality for the prioritized person 302 that is not the highest possible image quality that the image capture device 100 is capable of capturing.

FIG. 3C identifies an adjusted region of interest 310 of the image 300 that includes predetermined prioritized person from the priority subject data 165. For example, adjusted region of interest 310 includes image data corresponding to first person 302, but not second person 304 nor third person 306. Image capture device 100 can adjust at least one of automatic focus, automatic exposure, or automatic white balance based on the adjusted region of interest 310. Using the ROI 310, the image capture device 100 can capture an image with the best image quality for the face of the first person 302, and permit a possible slight reduction in image quality of the other subjects 304, 306.

Figure 4A:
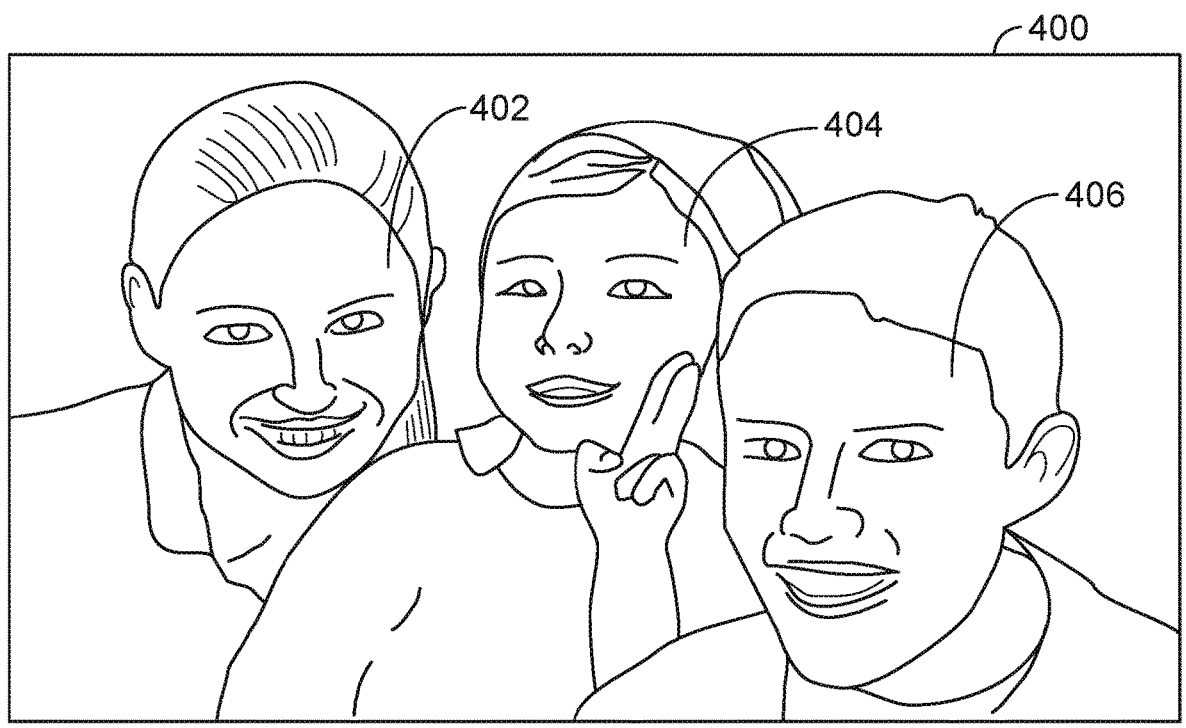
FIG. 4A is an image showing subjects in a FOV of the exemplary image capturing device of FIG. 1.
Figure 4B:
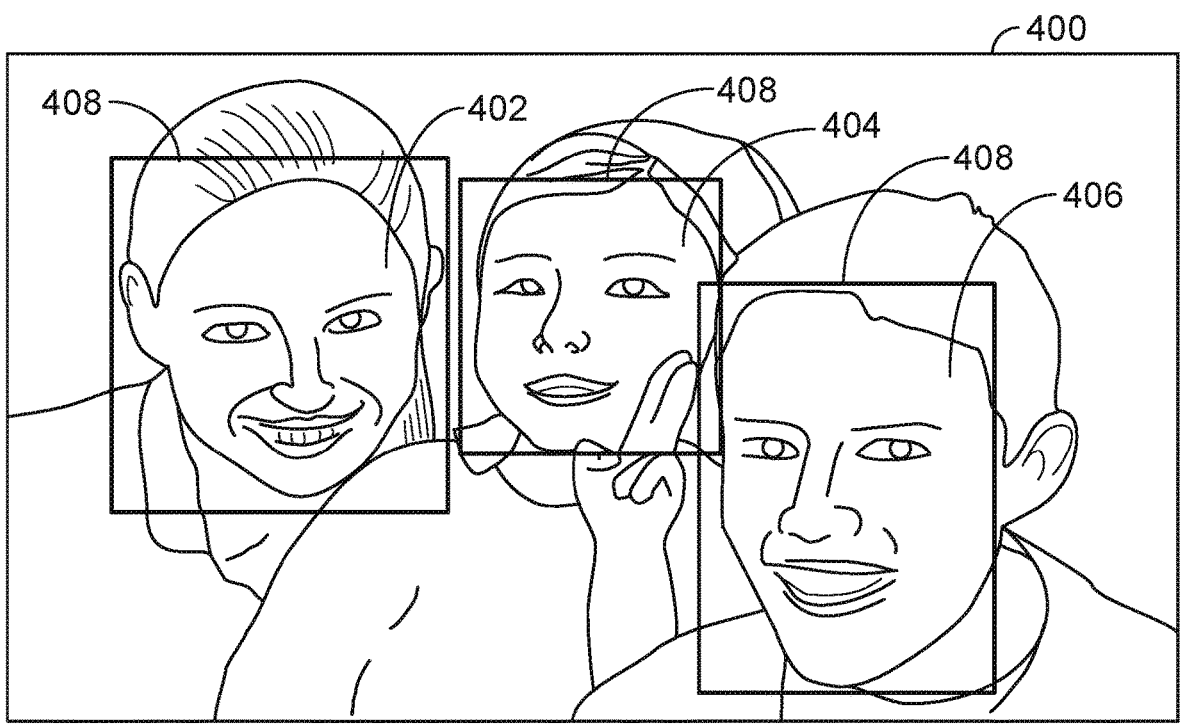
FIG. 4B illustrates the image of FIG. 4A with a ROI identified that includes the faces of the subjects in the FOV.
Figure 4C:
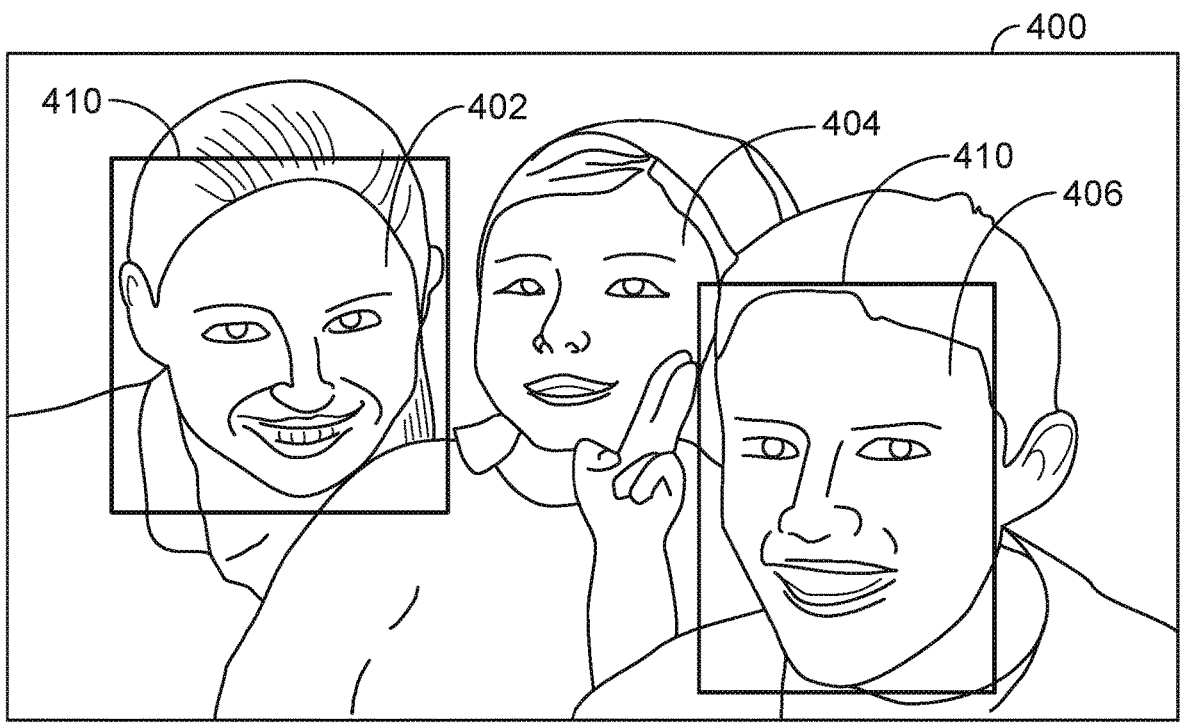
FIG. 4C illustrates the image of FIG. 4A with an adjusted ROI identified that includes faces of a subset of the priority subjects in the FOV.

FIGS. 4A, 4B, and 4C illustrate an exemplary image preview 400 in a field of view of the exemplary image capture device 100 of FIG. 1. The image 400 includes images of a first person 402, second person 404, and third person 406. Image capture device 100 can perform facial detection and recognition on image data associated with image 400 to identify detected subjects.

For example, FIG. 4B illustrates a region of interest 408 that includes image data for all identified subjects including first person 402, second person 404, and third person 406. For this example, assume that first person 402 and third person 406 are each predetermined prioritized persons, but the second person 404 is not included in the priority subject data 165. For example, image capture device 100 can include image data or other priority subject image-indicative data corresponding to first person 402 and third person 406 in the priority subject data 165. If used for AF, AE, and AWB, the ROI 408 as shown in FIG. 4B is optimized for all three persons 402, 404 and 406. The lens position is selected to minimize the total focus error among all three faces 402, 404 and 406, but does not guarantee the best possible focus, exposure or white balance for persons 402 and 406. Thus, the ROI 408 could increase the image quality of the subject 404 at the expense of the priority subjects 402 and 406.

FIG. 4C identifies an adjusted region of interest 410 of the image 400 that includes predetermined prioritized persons 402 and 406. For example, adjusted region of interest 410 includes image data corresponding to the faces of first person 402 and third person 406, but not second person 404. Image capture device 100 can adjust at least one of automatic focus, automatic exposure, or automatic white balance based on the adjusted region of interest 410. Adjusted region of interest 410 can provide the optimum focus, exposure and white balance with minimum total error for the faces of the prioritized persons 402, 406

In some embodiments, the processor 160 can train a neural network with several images of the primary user, and use the neural network to determine whether the face in the FOV of the image capture device 100 belongs to the primary user. For example, the processor 160 can use unsupervised learning to train a variational autoencoder with images of the priority subject, and use outlier detection to determine if a subject in the FOV of the camera belongs to the class of the training subject (corresponding to the priority subject). The outlier detection can use a random sampling consensus (RANSAC) or random forest technique.

In some examples, processor 160 compares image data (or data extracted or derived therefrom) for each detected subject in the FOV to previously stored priority subject image-indicative data (e.g., image data) of priority subjects (e.g., persons or animals) in a priority subject data 165. (As discussed herein, the priority subject data 165 identifies one or more subjects for whom the storage medium 110 stores priority subject image-indicative data (e.g., one or more images or images plus text), and who are to be given priority when selecting the ROI for an AF, AE or AWB operation.) The priority subject data 165 can include priority subject image-indicative data (e.g., image data) for one or more predetermined prioritized persons, and can be stored as priority subject data 165 in the non-transitory, machine-readable storage medium 110, for example. The priority subject data 165 can include a plurality of training images (or training data corresponding to other priority subject image-indicative data) for each predetermined priority subject. The priority subject data 165 may also include text, such as a name and/or bibliographic data associated with one or more of the prioritized subjects.

In some embodiments, the priority subject data 165 has a single priority level; faces in the priority subject data 165 are given priority over faces that are not included in the priority subject data 165. In other embodiments, the priority subject data 165 has multiple priority levels. If the FOV contains persons included in priority subject data 165 with two or more different priority levels and/or persons who are not included in the priority subject data 165, then the ROI for AF, AE and AWB can be selected to only include the face of the person with the highest priority level. The persons with lower priority levels and persons not included in the priority subject data 165 can be excluded from the ROI.

Figure 5:
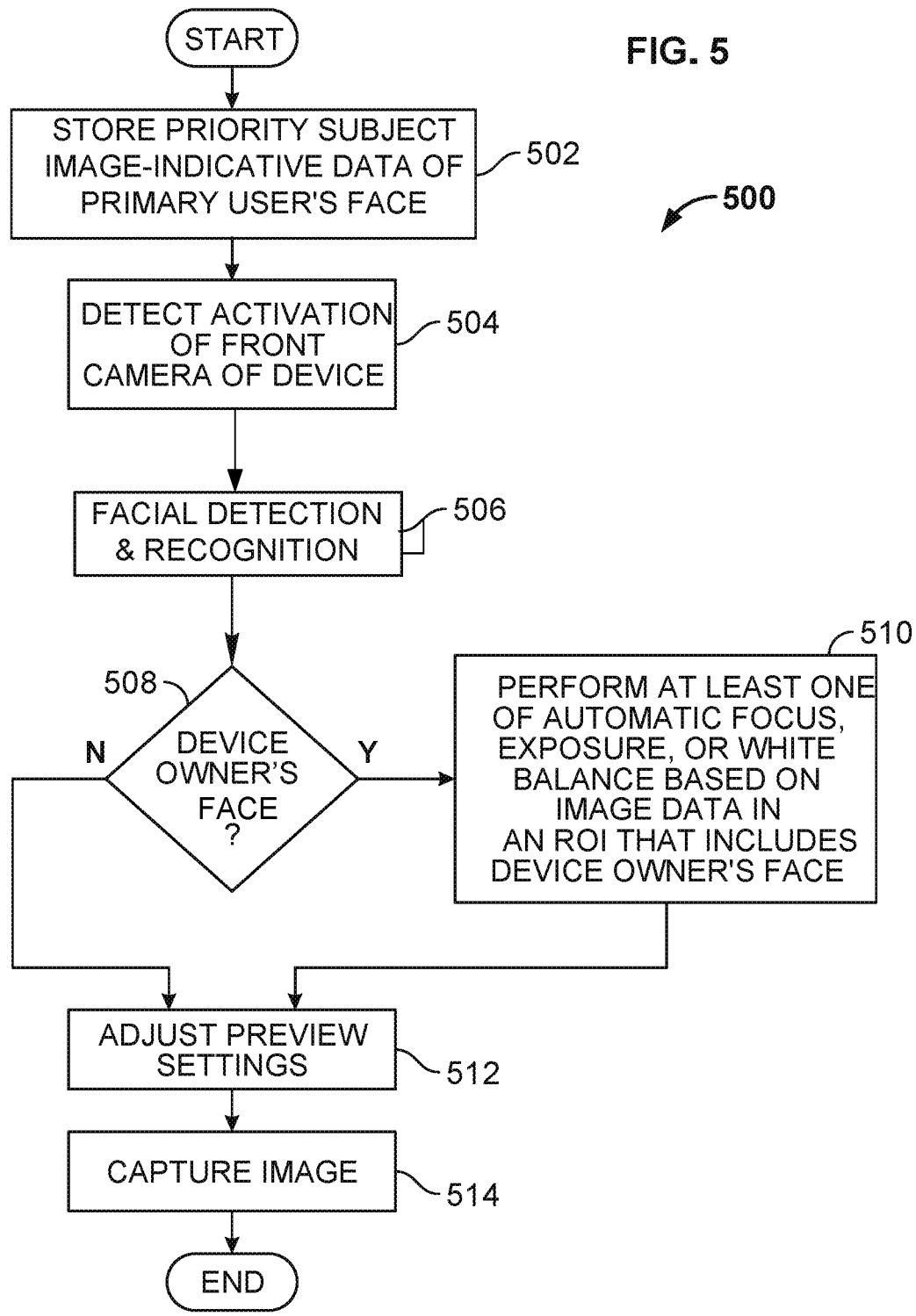
FIG. 5 is a flowchart of an exemplary method that can be carried out by the exemplary image capturing device having priority-subject based region of interest selection for automatic focus, automatic exposure, or automatic white balance control of FIG. 1.

FIG. 5 is a flow chart of an exemplary method 500 that can be carried out by, for example, image capture device 100. In the example of FIG. 5, the image capture device 100 is configured to detect and recognize when the camera's primary user (e.g., owner) is within the FOV, and to use an ROI narrowly enclosing the face of the camera primary user for AF, AE and AWB, regardless of whether the FOV contains additional people. This will cause the primary user to have the best image quality possible, even if there are other faces closer to the camera than the primary user.

At block 502, an priority subject image-indicative data (e.g., an image) of the primary user's face is stored in a non-transitory, machine-readable storage medium 110 (FIG. 1) in the image capture device 100. For example, the image can be captured via a selfie and stored in storage medium 110. Alternatively, the image can be received from an external camera (not shown) and saved in the photographs folder (not shown) of the image capture device 100. In some embodiments, the image capture device 100 has a folder containing priority subject data 165 (FIG. 1) for storing priority training images of the primary user.

At block 504, an image capture device 100, detects activation of a front camera on a front face of the image capture device, where the front face has a display. For example, if the image capture device 100 is a mobile phone, the front camera is the camera on the face of the phone having the display. In response to activation of the camera located on the front face of the image capture device, block 504 initiates a "selfie mode", in which the image capture device 100 searches for priority subjects in the FOV of the camera.

At block 506, the subject detector 144 (FIG. 1) applies face detection and facial recognition to search for at least one face within the first image data within the FOV (i.e., preview image data). In some embodiments, while operating in the selfie mode, the priority subject selector 146 attempts to match the detected face in the first image data within the FOV of the image capture device against the face of the primary user. In other embodiments, the priority subject selector 146 attempts to match the detected face in the first image data within the FOV of the image capture device against faces of all priority users.

At block 508, a determination is made as to whether the face of the primary user was recognized. For example, the priority subject selector 146 can compare a face within the first image data within the FOV against one or more stored images of the primary user's face stored in the storage medium 110. If the primary user is recognized, execution proceeds to block 512. If the primary user is detected, the method proceeds to block 510.

At block 510, the ROI used for at least one of automatic focus, automatic exposure, or automatic white balance is adjusted based on identification of one or more faces within the field of view of the device that includes the primary user's face. For example, one or more of automatic focus, automatic exposure, or automatic white balance parameters can be adjusted. Then AF, AE and/or AWB is performed using the adjusted parameters.

At block 512, one or more preview settings are adjusted in accordance with the new parameters computed by AF, AE and/or AWB based on the adjusted ROI.

At block 514, the image capture device 100 captures a second image data within the FOV of the image capture device 100, based on the automatic focus, automatic exposure, or automatic white balance using the selected region of interest. For example, if the primary user is recognized by the priority subject selector 146 (FIG. 1), the image of the primary user within the FOV is captured using the one or more adjusted automatic focus, automatic exposure, or automatic white balance.

Figure 6:
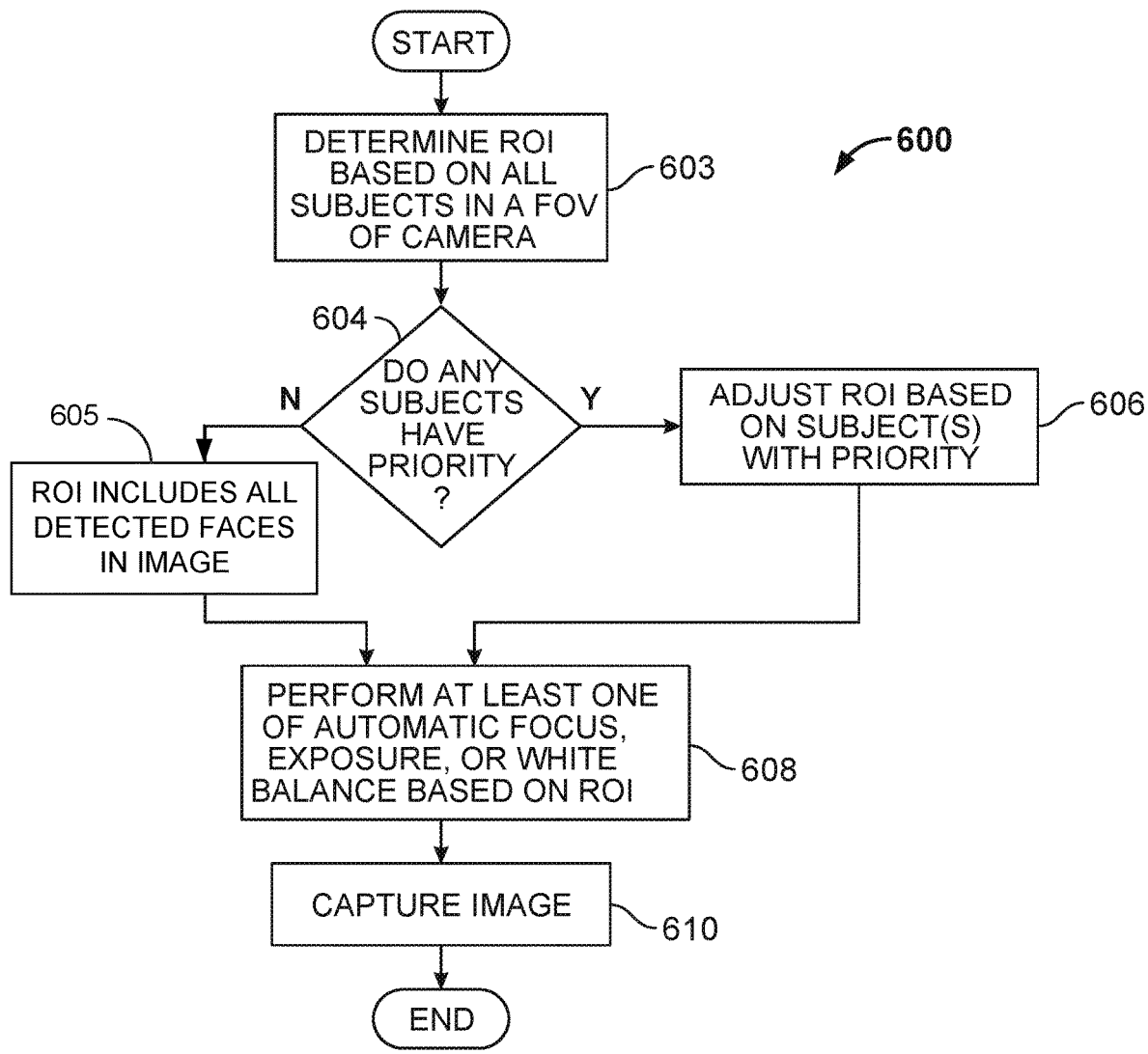
FIG. 6 is a flowchart of another exemplary method that can be carried out by the exemplary image capturing device having priority region of interest selection for subject based automatic focus, automatic exposure, or automatic white balance control of FIG. 1.

FIG. 6 is a flowchart 600 of another exemplary method that can be carried out by, for example, the image capture device 100 of FIG. 1. In the example of FIG. 6, the image capture device 100 has a priority subject data 165 containing a set of images or other priority subject image-indicative data showing any desired number of prioritized persons (e.g., members of the primary user's family, the family pet). In some embodiments, the priority subject data 165 contains a plurality of images or other priority subject image-indicative data for each priority subject. In other embodiments, the priority subject data 165 also includes bibliographic information associated with each of the priority subjects. The ROI adjuster 147 (FIG. 1) adjusts the ROI to include each person in the priority subject data 165 within the FOV, and to exclude any persons who are not in the priority subject data 165.

At block 603, a region of interest is determined based on all subjects in a field of view of a camera. For example, if subject detector 144 (FIG. 1) determines that there are a plurality of faces (e.g., faces 402, 404, 406, FIG. 4) in the FOV of the image capture device 100, the ROI is set to ROI 408, so as to include all of the identified faces in the FOV.

At block 604, subject detector 144 (FIG. 1) determines whether any subjects in the field of view of the camera have priority. For example, subject detector 144 compares image data of the subjects in the region of interest (or data extracted or derived therefrom) to priority subject image-indicative data (e.g., image data) of predetermined prioritized persons in a priority subject data 165. If no subjects have priority, the method proceeds to block 608. Otherwise, if any subjects have priority, the method proceeds to block 606.

At block 606, ROI adjuster 147 (FIG. 1) adjusts the region of interest based on the determination that one or more of the subjects in the FOV have priority. For example, the region of interest can be adjusted to include subjects having priority, but exclude subjects not having priority. The method then proceeds to block 608.

At block 608, the 3A engine 136 performs at least one of AF, AE, or AWB based on the adjusted region of interest. If any subjects were determined to have priority in block 604, then the region of adjusted interest (e.g., 410, FIG. 4C) includes the regions of interest 410 (FIG. 4C) determined in block 606. Otherwise, the region of interest 408 (FIG. 4B) includes all the regions of interests 404, 408 (FIG. 4B) determined in block 603.

At block 610, the camera optics and sensor 115 (FIG. 1) capture an image. For example, the image can be captured using the AF, AE, and AWB optimized for the adjusted ROI 410 (FIG. 4C).

In other embodiments, the priority subject data 165 can include two or more priority levels. The priority subject data 165 can assign one or more predetermined prioritized persons to respective priority levels. For example, a first predetermined prioritized person (e.g., the primary user's child) can be assigned a highest priority, a second predetermined prioritized person (e.g., the primary user) can be associated with a next highest priority, and so on. If the FOV of the image capture device 100 includes a higher priority subject and a lower priority subject, the ROI adjuster 147 includes the higher priority subject in the ROI (for AF, AE and/or AWB) and excludes the lower priority subject. If the FOV of the image capture device 100 includes a lower priority subject and an unknown subject, the ROI adjuster 147 includes the lower priority subject in the ROI and excludes the unknown subject. In general, if the FOV contains subjects with two or more priority levels, the ROI adjuster 147 includes the subject having the highest priority level in the ROI and excludes any other persons within the FOV from the ROI.

In some examples, some prioritized persons can be predetermined or selected in advance by a user. Other prioritized persons are not pre-selected, but may be automatically added to the priority subject data 165 in response to determining that the priority subject selector 146 determining that the same subject has been captured at least a threshold number of times within a predetermined time interval.

In some examples, processor 160 can determine whether any of the detected subjects in the image have different priority levels among persons of the priority subject data 165. For example, processor 160 can identify two priority subjects in the image, where one subject is associated with the highest priority level in the priority subject data 165, and another subject is associated with the next highest priority level in the priority subject data 165. In some examples, processor 160 determines if a configurable number of detected subjects are prioritized persons. For example, the configurable number of detected subjects can be set by a user of image capture device 100 via input device 170.

In some examples, the priority subject data 165 includes predetermined prioritized persons associated with a priority level, and dynamically selected prioritized persons automatically added by virtue of being captured a threshold number of times within a predetermined period. In other embodiments, the priority subject data 165 contains two separate lists or folders: static priority subject data 165 containing the priority subjects previously selected (by the primary user) and a temporary list or folder containing automatically added priority subjects. Processor 160 can determine whether any of the detected subjects is a previously selected priority subject with a previously selected priority level. If no detected subjects within the FOV are identified as being prioritized persons, processor 160 can dynamically determine whether any detected subjects have been captured a threshold number of times within a predetermined period. Dynamically selected subjects can be added to a list or folder of temporary priority subject data 165 for a predetermined period of time.

In some examples, processor 160 can determine if up to a configurable number of subjects detected are priority subjects. A user of image capture device 100 can set the configurable number of priority subjects via input device 170.

In some examples, priority subject selector instructions 146 can include instructions that, when executed by processor 160, cause processor 160 to identify (e.g., select) at least two detected subjects as predetermined prioritized persons. For example, if two out of three or more persons within the FOV are priority subjects in the priority subject data 165, the ROI for performing AF, AE and AWB includes the faces of the two priority subjects, and any other persons within the FOV are excluded from the ROI for AF, AE, and AWB.

In some examples, priority subject selector 146 can include instructions that, when executed by processor 160, cause processor 160 to add a dynamically selected priority subject to the temporary priority subject data, based on a location of the image capture device 100 at the time of image capture. This capability can allow the user to select a location (e.g., the user's home or a vacation spot) at which every person captured is added to the temporary priority subject data 165. The selected location can be, for example, the person's home address, home state, favorite place, or any other location. For example, processor 160 can obtain a location of image capture device 100 by receiving location data from GPS unit 116, and compare the current location to the selected location. Location data can include, for example, latitude and longitude information. In other embodiments, the processor 160 can determine the current location of the image capture device 100 based on the location of a WiFi access point, triangulation from beacons, signal from a "smart watch", or the like. If processor 160 determines that the location of image capture device 100 is at or near the selected location, the priority subject selector 146 can add the person to the priority subject data 165. For example, any person within the FOV of the image capture device 100 while the image capture device is located at the user's home will be added to the temporary priority subject data 165.

In some embodiments, the image capture device maintains separate priority subject data 165 for persons associated with each of a plurality of selected locations. In some examples, a person can be associated with more than one location. In some examples, location information associated with priority subjects can be included in the priority subject data 165 stored in storage medium 110. For example, a user can provide location information to be associated with priority subjects to image capture device 100 via input device 170.

In some examples, priority subject selector instructions 146 can include instructions that, when executed by processor 160, cause processor 160 to recognize at least one priority subject based on image data corresponding to the priority subject obtained over a network. For example, transceiver 117 is operable to transmit data to, and receive data from, a network. The network can be a WiFi® network, a cellular network such as a 3GPP® network, a Bluetooth® network, or any other suitable network. The network can provide access to, for example, the Internet. Processor 160 is in communication with transceiver 117, and can request and receive image data corresponding to one or more predetermined prioritized persons from the network. For example, processor 160 can search social media, a search engine, or an online encyclopedia over the network for images of a nearby person based on the location of the image capture device, obtain one or more images of the nearby person from social media, search engine, or online encyclopedia via the network, and add the nearby person to the priority subject data 165. Processor 160 can add the one or more obtained images (or other image-indicative data based on the obtained images) of the nearby person to a folder storing images of persons identified in the priority subject data 165, for example.

In other embodiments, the image capture device 100 allows the user to add the name of an individual to the priority subject data 165, and the image capture device automatically retrieves training images associated with the named individual from a search engine, social media and/or the user's photo library in the image capture device. The image capture device 100 uses machine learning to learn the person's face, and recognizes the person's face as being associated with a prioritized person when the face is within the FOV of the image capture device 100.

In some examples, priority subject selector instructions 146 can include instructions that, when executed by processor 160, cause processor 160 to add at least one predetermined prioritized person to the priority subject data 165, based on how often the predetermined prioritized person has been detected as a subject in the FOV of the image capture device 100. For example, processor 160, when executing subject detector instructions 144, can associate a time of capture with each detected subject. Processor 160 can store image data associated with each detected subject, along with a time of capture, as part of the priority subject data 165 stored in storage medium 110. If the same subject is detected, processor 160 can update the most recent time of capture associated with that subject. Processor 160 can also maintain a count of how many times the subject has been detected. For example, the count can be based on how often the subject was detected over a period of time (e.g., over the last month, week, day, etc.). In some examples, the count can be configured by a user via input device 170. The count can also be stored as part of priority subject data 165 in storage medium 110.

Processor 160, when executing priority subject selector instructions 146, can read priority subject data 165 from storage 110 to determine how often the subject in the FOV has been detected over a recent period of time. If the subject has been detected more than a threshold number of times during that period, processor 160 can add the person to the priority subject data 165. If the image capture device 100 does not associate the person with a name, the image capture device can generate a temporary name for the subject. If the subject has not been detected more than the threshold number of times during the period, the subject is not added to the priority subject data 165. For example, processor 160 can determine that at least one of one or more subjects in the field of view of the image capture device 100 has previously been photographed using the image capture device (and previously detected as a subject). Processor 160 can store image data (or other image-indicative data based on the image data) corresponding to the previously captured subject to the priority subject data 165 in storage medium 110.

Processor 160 can be configured to add images or other image-indicative data of a person to the priority subject data 165 (or a temporary priority subject data 165) if a threshold number of images of the same person are determined to be captured within a predetermined period of time. For example, processor 160 can add images or other image-indicative data of a person to the priority subject data 165 (or a temporary priority subject data 165) if the same person is captured in ten images within one minute. In some embodiments, the temporary priority subject data 165 can be purged upon passage of a predetermined period (e.g., one week) after being added to the temporary priority subject data 165. In all other respects the temporary priority subject data 165 can be structured and used the same way as the static priority subject data 165 described herein.

Figure 7:
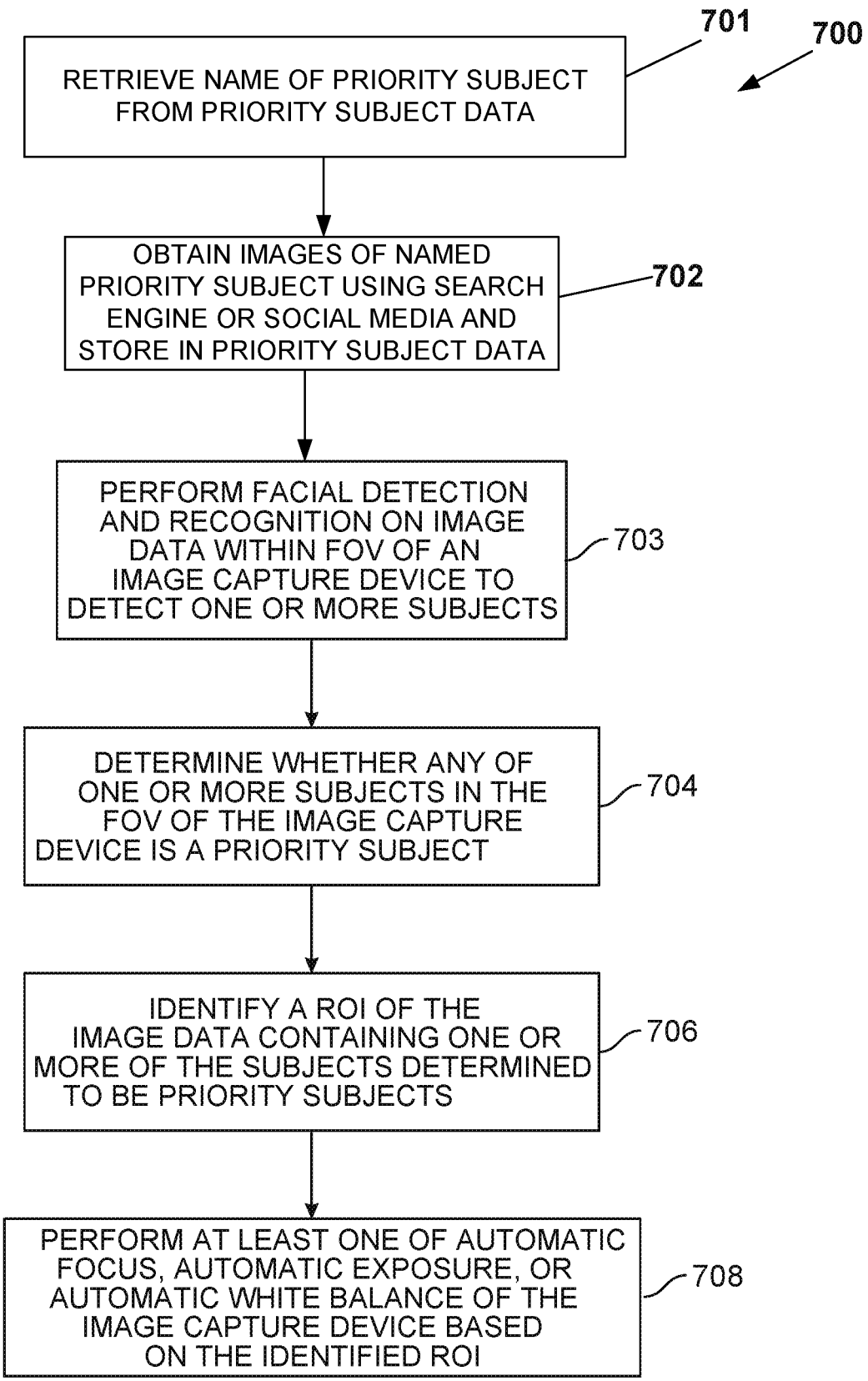
FIG. 7 is a flowchart of another exemplary method that can be carried out by the exemplary image capturing device having region of interest selection for priority subject-based automatic focus, automatic exposure, or automatic white balance control of FIG. 1.

FIG. 7 is a flowchart 700 of another exemplary method that can be carried out by, for example, the image capture device 100 of FIG. 1. In the example of FIG. 7, instead of using images captured by the user to specify predetermined prioritized persons, the priority subject selector 146 (FIG. 1) allows the user to input the name of a subject (e.g., a well-known public figure) whom the user wishes to photograph. The priority subject selector 146 can obtain images of the predetermined person from the Internet using a search engine (e.g., Google). The image capture device can save the images or other priority subject image-indicative data into a folder within priority subject data 165 for "temporary prioritized persons". The saved images can be used for adjusting the ROI for AF, AE and AWB, in the manner described above for the primary user of the image capture device 100. When the image capture device is used, the subject in the FOV can be compared to the temporary prioritized person; if the FOV contains the temporary prioritized person, the priority subject selector 146 selects an ROI containing the face of the temporary predetermined person.

At block 701, priority subject selector 146 retrieves the name of a priority subject from the priority subject data 165. In some embodiments, priority subject selector 146 determines that the number of images or views (or other priority subject image-indicative data) of the subject is insufficient for accurate recognition. In other embodiments, the priority subject data 165 includes a separate folder or storage area for identifying names of priority subjects without accompanying images or other priority subject image-indicative data.

At block 702, subject detector 144 tries again to obtain images of the named priority subject using a search engine (e.g., Google or Yahoo!) or using social media (e.g., Facebook).

At block 703, subject detector 144 performs facial detection on image data within a field of view of an image capture device 100 to detect one or more subjects.

At block 704, priority subject selector 146 determines whether any of the subjects in the field of view of the image capture device 100 is a predetermined person.

At block 706, a region of interest of image data is identified that contains one or more of the subjects determined to be a predetermined person, and excludes one or more subjects determined not to be pre-determined persons.

At block 708, at least one of AF, AE, or AWB of the image capture device is performed based on the identified region of interest. For example, the AF, AE, and AWB can all be performed based on the identified region of interest.

Figure 8:
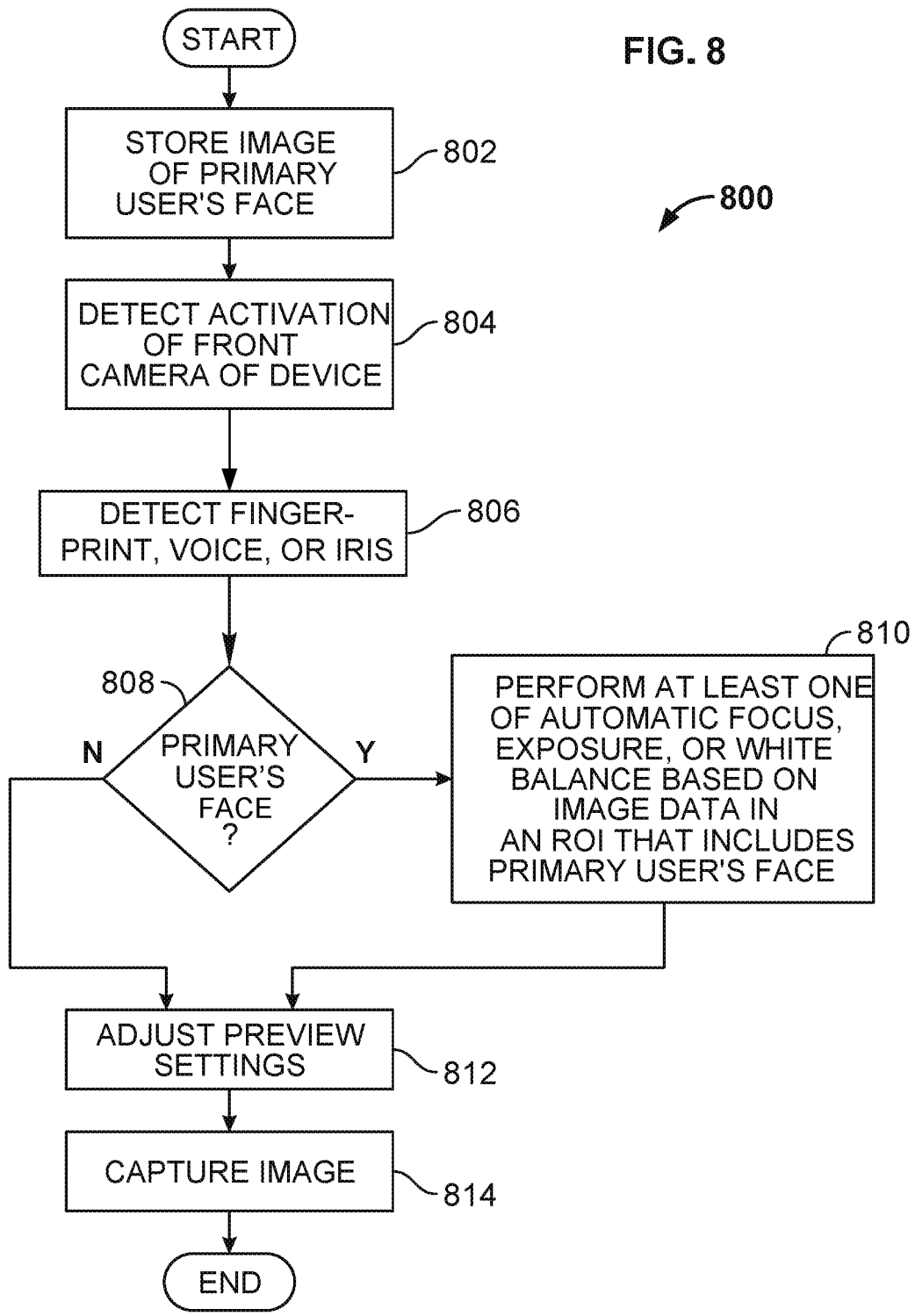
FIG. 8 is a flowchart of a method that activates face recognition upon detection of a fingerprint of a primary user of the image capture device.

FIG. 8 is a flow chart of an exemplary method 800 that can be carried out by image capture device 100. In the example of FIG. 8, the priority subject detection mode is activated when the primary user's fingerprint is detected while the front camera of the image capture device 100 is activated.

At block 802, an image of the device primary user's face (or other priority subject image-indicative data derived therefrom) is stored in a non-transitory, machine-readable storage medium 110 (FIG. 1) in the image capture device 100. For example, the image can be captured via a selfie and stored in storage medium 110 or, the image can be received from an external camera (not shown) and saved in the priority subject data 165 of image capture device 100.

At block 804, a front camera of image capture device 100 is activated, where the front face is the face having a display.

At block 806, biometric information (fingerprint, iris, or voice) of the user is detected. For example, if the image capture device 100 is a cell phone, a fingerprint detection device 175 can be located on the home button of the phone. In response to the fingerprint detection device 175 (FIG. 1) of image capture device 100 detecting the primary user's fingerprint while the front camera is active, execution automatically passes to block 808, activating facial recognition. Similarly, in other embodiments, execution passes to block 808 in response to the phone detecting the primary user's iris or voice.

At block 808, a determination is made as to whether a face of the primary user is in the FOV. For example, the priority subject selector 146 can compare a face within the FOV against one or more stored images of the primary user's face stored in the storage medium 110. If the primary user is detected, execution proceeds to block 812. If the primary user is detected, the method proceeds to block 810.

At block 810, the ROI used for at least one of automatic focus, automatic exposure, or automatic white balance is adjusted based on identification of the primary user's face.

At block 812, one or more preview settings are adjusted in accordance with the new parameters computed by AF, AE and/or AWB based on the adjusted ROI.

At block 814, an image is captured. For example, if the primary user is recognized by the priority subject selector 146 (FIG. 1), the image is captured using the one or more adjusted automatic focus, automatic exposure, or automatic white balance.

Figure 9:
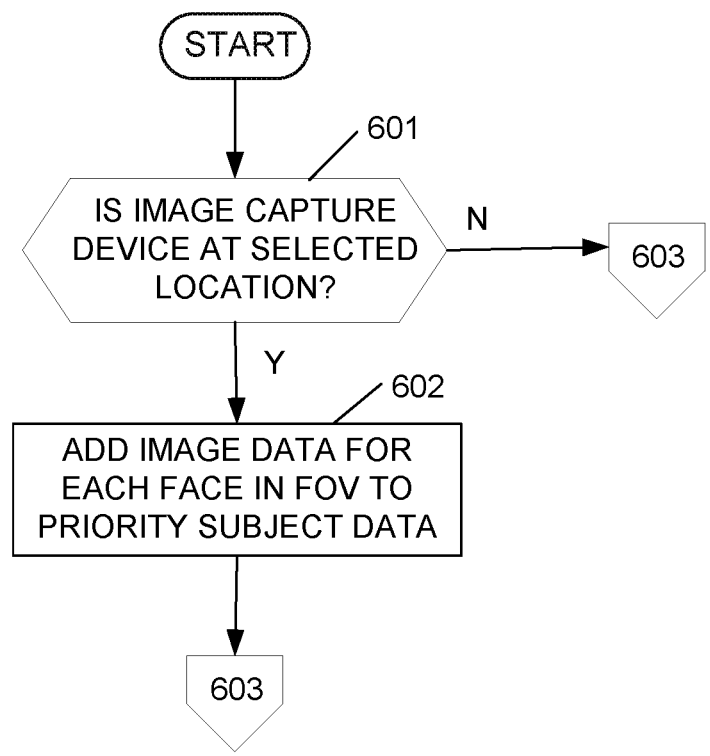
FIG. 9 is a flow chart showing additional steps that can be added to some embodiments of the method of FIG. 6.

FIG. 9 shows additional blocks that can be added to the method of FIG. 6, in some embodiments. The additional blocks in FIG. 9 designate a person in a field of view of the image capture device as a priority subject in response to determining that the image capture device is in a predetermined location. Blocks 601 and 602 of FIG. 9 are executed prior to execution of block 603 (FIG. 6).

At block 601, a determination is made whether the image capture device 100 is located in a predetermined location entered into the priority subject data 165. For example, the predetermined location can be identified by name, address or by GPS coordinates. If the image capture device 100 is located in a predetermined location, block 602 is executed. If the image capture device 100 is not located in a predetermined location, execution passes to step 603 of FIG. 6.

At block 602, image data (or other image-indicative data extracted or derived therefrom) for each face in the FOV are added to the priority subject data 165 in the image capture device 100. After block 602, execution passes to block 603, FIG. 6.

Using the method of FIGS. 9 and 6, the user can instruct the image capture device to make every face detected in a predetermined location (e.g., the user's home, a vacation spot, a place of employment, etc.) a priority subject. Subsequently, when these priority subjects are within the FOV of the image capture device, they will be included in the ROI for AE, AF, and/or AWB.

Although the methods described above are with reference to the illustrated flowcharts, many other ways of performing the acts associated with the methods can be used. For example, the order of some operations may be changed, and some embodiments can omit one or more of the operations described and/or include additional operations.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Although the subject matter has been described in terms of exemplary embodiments, it is not limited thereto. For example, the claims are not limited to the exemplary embodiments. For example, some claimed implementations can have different features than that in the exemplary embodiments. In addition, changes can be made without departing from the spirit of the disclosure. For example, features of the exemplary embodiments can be incorporated in different systems (e.g., devices) and methods. Thus, the appended claims should be construed broadly, to include other variants and embodiments, which can be made by those skilled in the art having the benefit of the present disclosures.

We claim:

1. A method for controlling an image capture device, comprising:
   obtaining first image data from a camera of the image capture device, the first image data representing one or more subjects within a field of view of the image capture device;
   performing facial recognition on the first image data based on priority subject image-indicative data comprising coefficient data for a particular subject, wherein performing the facial recognition comprises:
     applying a trained neural network to the coefficient data and to the first image data; and
     identifying a face of the particular subject based on the application of the trained neural network to the coefficient data and to the first image data;
   determining, based on the facial recognition, that the one or more subjects include the particular subject;

selecting a region of interest corresponding to at least the particular subject; and processing a second image based on the selected region of interest.

2. The method of claim 1, wherein performing the facial recognition comprises detecting a face within the first image data.

3. The method of claim 1, wherein:
the priority subject image-indicative data comprises a plurality of stored facial features for the particular subject; and
performing the facial recognition comprises:
extracting facial features from the first image data; and
comparing the stored plurality of stored facial features with the extracted facial features.

4. The method of claim 1, wherein:
the priority subject image-indicative data comprises a plurality of stored intensity values for the particular subject; and
performing the facial recognition comprises:
determining intensity values from the first image data; and
comparing the plurality of stored intensity values with the determined intensity values.

5. The method of claim 4, wherein the neural network is trained to identify members of a predetermined set of priority subjects comprising the particular subject.

6. The method of claim 1, wherein processing the second image data includes capturing the second image data.

7. The method of claim 6, wherein the second image data is captured using at least one of an automatic focus, automatic exposure, or automatic white balance setting determined based, at least in part, on the selected region of interest.

8. The method of claim 1, comprising:
receiving a user selection; and
obtaining the priority subject image-indicative data based on the user selection.

9. The method of claim 1, wherein the region of interest includes each of the one or more subjects.

10. The method of claim 1, wherein selecting the region of interest comprises adjusting the region of interest to include the particular subject.

11. The method of claim 10, wherein the selecting further comprises adjusting the region of interest to exclude at least one of the one or more subjects.

12. An image capture device comprising:
a memory containing priority subject image-indicative data corresponding to at least one particular subject; and
at least one processor coupled to the memory for accessing the priority subject image-indicative data, the at least one processor being configured to:
obtain first image data from a camera of the image capture device, the first image data representing one or more subjects within a field of view of the image capture device;
perform facial recognition on the first image data based on priority subject image-indicative data comprising coefficient data for a particular subject, wherein the at least one processor is further configured to:
apply a trained neural network to the coefficient data and to the first image data; and
identify a face of the particular subject based on the application of the trained network to the coefficient data and to the first image data;
determine, based on the facial recognition, that the one or more subjects include the particular subject;
select a region of interest corresponding to at least the particular subject; and
process a second image based on the selected region of interest.

13. The image capture device of claim 12, wherein the at least one processor is further configured to detect a face within the first image data.

14. The image capture device of claim 12, wherein:
the priority subject image-indicative data comprises a plurality of stored facial features for the particular subject; and
the at least one processor is further configured to:
extract facial features from the first image data; and
compare the stored plurality of stored facial features with the extracted facial features.

15. The image capture device of claim 12, wherein:
the priority subject image-indicative data comprises a plurality of stored intensity values for the particular subject; and
the at least one processor is further configured to:
determine intensity values from the first image data; and
compare the plurality of stored intensity values with the determined intensity values.

16. The image capture device of claim 12, wherein the neural network is trained to identify members of a predetermined set of priority subjects comprising the particular subject.

17. The image capture device of claim 12, wherein the at least one processor is further configured to capture the second image data.

18. The image capture device of claim 17, wherein the at least one processor is further configured to capture the second image data using at least one of an automatic focus, automatic exposure, or automatic white balance setting determined based, at least in part, on the selected region of interest.

19. The image capture device of claim 12, wherein the at least one processor is further configured to:
receive a user selection; and
obtain the priority subject image-indicative data based on the user selection.

20. The image capture device of claim 12, wherein the region of interest includes each of the one or more subjects.

21. The image capture device of claim 12, wherein the at least one processor is further configured to adjust the region of interest to include the particular subject.

22. The image capture of claim 21, wherein the at least one processor is further configured to adjust the region of interest to exclude at least one of the one or more subjects.

23. A non-transitory computer-readable storage medium comprising computer-executable instructions stored tangibly thereon, such that when the instructions are executed by one or more processors, the instructions cause the one or more processor to:
obtain first image data from a camera of the image capture device, the first image data representing one or more subjects within a field of view of the image capture device;
perform facial recognition on the first image data based on priority subject image-indicative data comprising coefficient data for a particular subject, wherein performing the facial recognition comprises:
applying a trained neural network to the coefficient data and to the first image data; and identifying a face of the particular subject based on the application of the trained network to the coefficient data and to the first image data;

determine, based on the facial recognition, that the one or more subjects include the particular subject;

select a region of interest corresponding to at least the particular subject; and process a second image based on the selected region of interest.

24. The non-transitory computer-readable storage medium of claim 23 wherein processing the second image data comprises capturing the second image data using at least one of an automatic focus, automatic exposure, or automatic white balance setting determined based, at least in part, on the selected region of interest.

* * * * *